US011342001B2

(12) United States Patent
Lilijeroos

(10) Patent No.: US 11,342,001 B2
(45) Date of Patent: May 24, 2022

(54) AUDIO AND VIDEO PROCESSING

(71) Applicant: Nokia Technologies Oy, Espoo (FI)

(72) Inventor: Ari-Pekka Lilijeroos, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/143,046

(22) Filed: Jan. 6, 2021

(65) Prior Publication Data

US 2021/0217444 A1 Jul. 15, 2021

(30) Foreign Application Priority Data

Jan. 10, 2020 (EP) .................................... 20151089

(51) Int. Cl.
*G11B 27/10* (2006.01)
*H04N 5/262* (2006.01)
*H04S 7/00* (2006.01)

(52) U.S. Cl.
CPC ........... *G11B 27/10* (2013.01); *H04N 5/2628* (2013.01); *H04S 7/30* (2013.01)

(58) Field of Classification Search
CPC .......... G11B 27/10; H04N 5/2628; H04S 7/30
See application file for complete search history.

(56) References Cited

U.S. PATENT DOCUMENTS

2007/0019066 A1 * 1/2007 Cutler .................... H04N 7/142
348/14.08
2007/0189551 A1 8/2007 Kimijima
(Continued)

FOREIGN PATENT DOCUMENTS

EP 2346028 A1 7/2011
EP 2680615 A1 1/2014
(Continued)

OTHER PUBLICATIONS

Begault, "3-D Sound for Virtual Reality and Multimedia", Academic Press Professional, Inc., Aug. 1994, p. 68.
(Continued)

*Primary Examiner* — Thai Q Tran
*Assistant Examiner* — Jose M Mesa
(74) *Attorney, Agent, or Firm* — Nokia Technologies Oy

(57) ABSTRACT

According to an example embodiment, a technique for zooming one or more images of a video stream into corresponding one or more images of a video signal for rendering together with a spatial audio signal that conveys a spatial audio image representing a range of sound directions that spatially correspond to a respective range of positions in images of the video signal is provided, the technique comprising: receiving the video stream, a plurality of audio signals and audiovisual metadata that defines a spatial relationship between images of the video stream and said plurality of audio signals that serve as basis for said spatial audio signal; determining presence of at least a first sound source and a second sound source depicted in an image of the video stream, wherein respective sounds originating from the first and second sound sources are to be represented in said spatial audio signal by a single directional sound component; determining a first zoom factor threshold for zooming said image of the video stream into a corresponding image of the video signal based at least in part on respective positions of said first and second sound sources in said image of the video stream in dependence of said audiovisual metadata; and zooming said image of the video stream into said corresponding image of the video signal in accordance with the first zoom factor threshold.

20 Claims, 9 Drawing Sheets

(56) References Cited

U.S. PATENT DOCUMENTS

| | | | |
|---|---|---|---|
| 2007/0247515 A1* | 10/2007 | Roman | H04N 7/15 |
| | | | 348/14.02 |
| 2009/0306973 A1 | 12/2009 | Hiekata et al. | |
| 2012/0082322 A1 | 4/2012 | Van Waterschoot et al. | |
| 2012/0311489 A1 | 12/2012 | Williams et al. | |
| 2016/0299738 A1 | 10/2016 | Mäkinen et al. | |
| 2017/0078819 A1* | 3/2017 | Habets | G10L 19/008 |

FOREIGN PATENT DOCUMENTS

| | | |
|---|---|---|
| EP | 3301952 A1 | 4/2018 |
| EP | 3340614 A1 | 6/2018 |
| WO | 2018/132385 A1 | 7/2018 |
| WO | 2020/240079 A1 | 12/2020 |

OTHER PUBLICATIONS

Khaddour et al., "A Novel Combined System of Direction Estimation and Sound Zooming of Multiple Speakers", Radioengineering, vol. 24, No. 2, Jun. 2015, pp. 583-592.

Extended European Search Report received for corresponding European Patent Application No. 20151089.8, dated Apr. 22, 2020, 9 pages.

\* cited by examiner

300

Receive a video stream, a plurality of audio signals and audiovisual metadata that defines a spatial relationship between images of the video stream and said plurality of audio signals that serve as basis for a spatial audio signal
302

Determine presence of a first sound source and a second sound source depicted in an image of the video stream, wherein respective sounds originating from the first and second sound sources are to be represented in said spatial audio signal by a single directional sound component
304

Determine a first zoom factor threshold for zooming said image of the video stream into a corresponding image of the video signal based at least in part on respective positions of the first and second sound sources in said image of the video stream
306

Determine a second zoom factor threshold for zooming said image of the video stream into the corresponding image of the video signal as a zoom factor that results in the first and second sound sources becoming excluded from said image of the video signal
308

Zoom said image of the video stream into said corresponding image of the video signal at least in accordance with the first zoom factor threshold
310

Figure 6

AUDIO AND VIDEO PROCESSING

TECHNICAL FIELD

The example and non-limiting embodiments of the present invention relate to processing of audio and video signals.

BACKGROUND

Already for many years, mobile devices such as mobile phones and tablet computers have been provided with a camera and a microphone arrangement that enable the user of the device to simultaneously capture audio and video. With the development of microphone technologies and with increase in processing power and storage capacity available in mobile devices, many such devices are provided with multi-microphone arrangements that enable capturing multi-channel audio, which in turn enables various possibilities for providing enhanced audio to accompany video signals recorded together with the audio.

Typically, the process of capturing a multi-channel audio signal using the mobile device comprises operating a microphone array arranged in the mobile device to capture a plurality of microphone signals and processing the captured microphone signals into a recorded multi-channel audio signal for further processing in the mobile device, for storage in the mobile device and/or for transmission to one or more other devices together with the associated video signal. The recorded multi-channel audio signal provided together with the corresponding video signal provides various possibilities of subsequent processing of the audio signal and/or the video signal in order to provide enhanced audiovisual user experience.

In one example, upon rendering an audio-visual scene conveyed by the recorded multi-channel audio signal and the corresponding video signal, the user may wish to apply video zooming in order to concentrate on desired details appearing in images of the video signal. In order to ensure high perceptual quality of the audio-visual scene, it is typically advantageous to ensure sufficient alignment between the zoomed video displayed to the user and the audio signal played back to the user.

SUMMARY

According to an example embodiment, a method for zooming one or more images of a video stream into corresponding one or more images of a video signal for rendering together with a spatial audio signal that conveys a spatial audio image representing a range of sound directions that spatially correspond to a respective range of positions in images of the video signal is provided, the method comprising: receiving the video stream, a plurality of audio signals and audiovisual metadata that defines a spatial relationship between images of the video stream and said plurality of audio signals that serve as basis for said spatial audio signal; determining presence of at least a first sound source and a second sound source depicted in an image of the video stream, wherein respective sounds originating from the first and second sound sources are to be represented in said spatial audio signal by a single directional sound component; determining a first zoom factor threshold for zooming said image of the video stream into a corresponding image of the video signal based at least in part on respective positions of said first and second sound sources in said image of the video stream in dependence of said audiovisual metadata; and zooming said image of the video stream into said corresponding image of the video signal in accordance with the first zoom factor threshold.

According to another example embodiment, an apparatus for zooming one or more images of a video stream into corresponding one or more images of a video signal for rendering together with a spatial audio signal that conveys a spatial audio image representing a range of sound directions that spatially correspond to a respective range of positions in images of the video signal is provided, the apparatus configured to: receive the video stream, a plurality of audio signals and audiovisual metadata that defines a spatial relationship between images of the video stream and said plurality of audio signals that serve as basis for said spatial audio signal; determine presence of at least a first sound source and a second sound source depicted in an image of the video stream, wherein respective sounds originating from the first and second sound sources are to be represented in said spatial audio signal by a single directional sound component; determine a first zoom factor threshold for zooming said image of the video stream into a corresponding image of the video signal based at least in part on respective positions of said first and second sound sources in said image of the video stream in dependence of said audiovisual metadata; and zoom said image of the video stream into said corresponding image of the video signal in accordance with the first zoom factor threshold.

According to another example embodiment, an apparatus for zooming one or more images of a video stream into corresponding one or more images of a video signal for rendering together with a spatial audio signal that conveys a spatial audio image representing a range of sound directions that spatially correspond to a respective range of positions in images of the video signal is provided, the apparatus comprising: means for receiving the video stream, a plurality of audio signals and audiovisual metadata that defines a spatial relationship between images of said video stream and said plurality of audio signals that serve as basis for said spatial audio signal; means for determining presence of at least a first sound source and a second sound source depicted in an image of the video stream, wherein respective sounds originating from the first and second sound sources are to be represented in said spatial audio signal by a single directional sound component; means for determining a first zoom factor threshold for zooming said image of the video stream into a corresponding image of the video signal based at least in part on respective positions of said first and second sound sources in said image of the video stream in dependence of said audiovisual metadata; and means for zooming images, arranged to zoom said image of the video stream into said corresponding image of the video signal in accordance with the first zoom factor threshold.

According to another example embodiment, an apparatus for zooming one or more images of a video stream into corresponding one or more images of a video signal for rendering together with a spatial audio signal that conveys a spatial audio image representing a range of sound directions that spatially correspond to a respective range of positions in images of the video signal is provided, wherein the apparatus comprises at least one processor; and at least one memory including computer program code, which, when executed by the at least one processor, causes the apparatus to: receive the video stream, a plurality of audio signals and audiovisual metadata that defines a spatial relationship between images of the video stream and said plurality of audio signals that serve as basis for said spatial audio signal; determine presence of at least a first sound source and a second sound source depicted in an image of the video stream, wherein respective sounds originating from the first and second sound sources are to be represented in said spatial audio signal by a single directional sound component; determine a first zoom factor threshold for zooming said image of the video stream into a corresponding image of the video signal based at least in part on respective positions of said first and second sound sources in said image of the video stream in dependence of said audiovisual metadata; and zoom said image of the video stream into said corresponding image of the video signal in accordance with the first zoom factor threshold.

According to another example embodiment, a computer program for audio focusing is provided, the computer program comprising computer readable program code configured to cause performing at least a method according to an example embodiment described in the foregoing when said program code is executed on a computing apparatus.

The computer program according to an example embodiment may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings. The examples and features, if any, described in this specification that do not fall under the scope of the independent claims are to be interpreted as examples useful for understanding various embodiments of the invention

BRIEF DESCRIPTION OF FIGURES

The embodiments of the invention are illustrated by way of example, and not by way of limitation, in the figures of the accompanying drawings, where

FIG. 6 illustrates a flowchart depicting a method according to an example;

DESCRIPTION OF SOME EMBODIMENTS

Figure 1A:
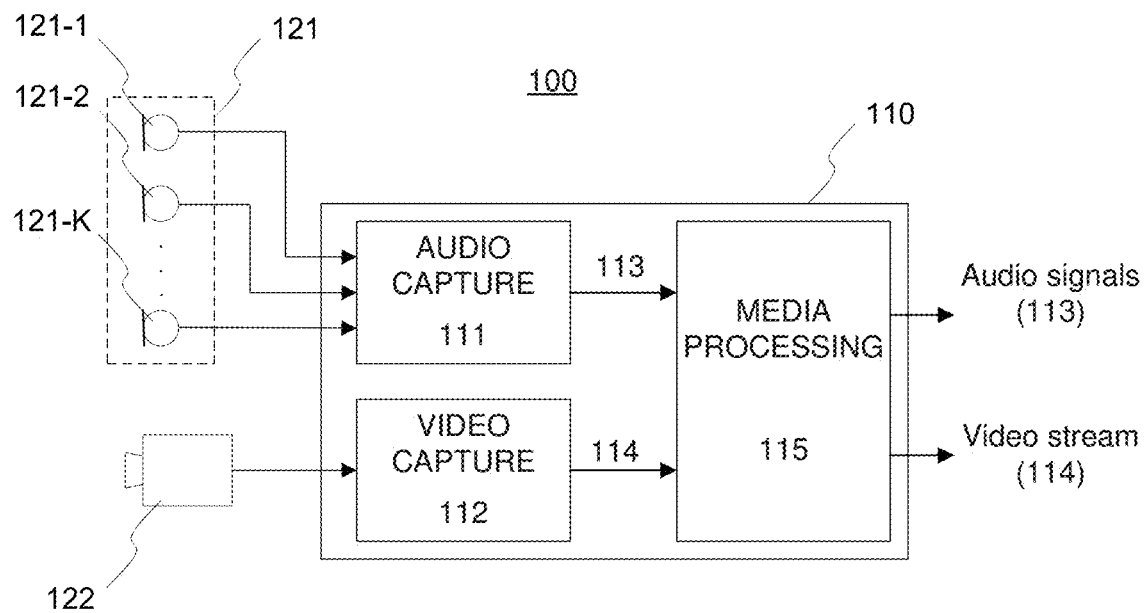
FIG. 1A illustrates a block diagram of some components and/or entities of a media capturing arrangement according to an example.
Figure 1B:
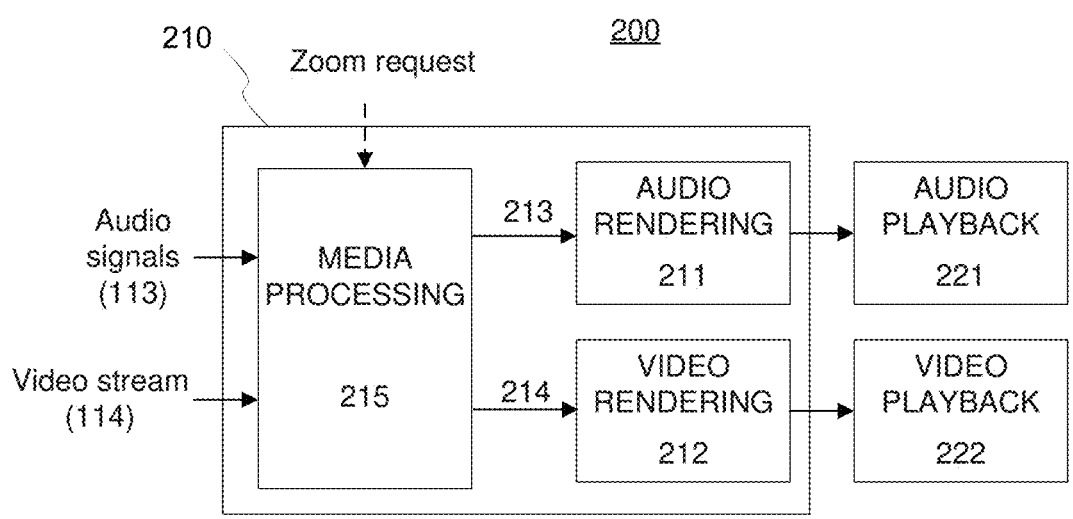
FIG. 1B illustrates a block diagram of some components and/or entities of a media rendering arrangement according to an example.

FIG. 1A illustrates a block diagram of some components and/or entities of a media capturing arrangement 100 according to an example. The media capturing arrangement 100 comprises a media capturing entity 110 that includes an audio capturing entity 111, a video capturing entity 112 and a media processing entity 115. FIG. 1B illustrates a block diagram of some components and/or entities of a media rendering arrangement 200 according to an example. The media rendering arrangement 200 comprises a media rendering entity 210 that includes an audio rendering entity 211, a video rendering entity 212 and a media processing entity 215.

The audio capturing entity 111 is coupled to a microphone array 121 and it is arranged to receive respective microphone signals from a plurality of microphones 121-1, 121-2, . . . , 121-K and to record a plurality of audio signals 113 based on the respective microphone signals. The microphones 121-1, 121-2, . . . , 121-K represent a plurality of (i.e. two or more) microphones. Herein, the concept of microphone array 121 is to be construed broadly, encompassing any arrangement of two or more microphones arranged in or coupled to a device implementing the media capturing arrangement 100. The video capturing entity 112 is coupled to a camera entity 122 and it is arranged to receive images from the camera entity 122 and to record the images as a video stream 114 comprising a sequence of digital images. The camera entity 122 may comprise, for example, one or more digital video camera devices and/or digital video camera modules. The media processing entity 115 may be arranged to control at least some aspects of operation of the audio capturing entity 111 and/or the video capturing entity 112. The plurality of audio signals 113 and the video stream 114 may be considered to represent an audio-visual scene at a location of the capturing arrangement 100.

Each microphone signal provides a different representation of the captured sound, which difference depends on the positions and orientations of the microphones of the microphone array 121 with respect to each other and respective direction patterns of the microphones of the microphone array 121. For a sound source in a certain spatial position with respect to the microphone array 121, this may result in capturing a sound originating from a certain sound source only in one of the microphone signals or in capturing a respective different representation of the sound originating from the certain sound source in two or more microphone signals: a first microphone 121-1 that is closer to the certain sound source captures the sound originating therefrom at a higher amplitude and earlier than a second microphone 121-2 that is further away from the certain sound source. The audio capturing entity 111 derives the plurality of audio signals 113 as respective digital audio signals based on the respective microphone signals such that their relative amplitudes and temporal alignment with respect to each other is preserved.

Consequently, together with the knowledge regarding the positions and orientations of the microphones of the microphone array 121 with respect to each other and their respective direction patterns, the plurality of audio signals 113 serves as basis for extracting or amplifying an audio signal that represents sounds arriving from a desired direction with respect to the microphone array 121 and/or using the plurality of the audio signals 113 as basis for deriving a spatial audio signal that provides a spatial representation of the captured audio where sounds originating from sound sources in the environment of the microphone array 121 are perceived to arrive at their respective directions with respect to the microphone array 121. Audio processing techniques for extracting or amplifying an audio signal that represents sound arriving from desired directions with respect to the microphone array 121 and for processing the plurality of the audio signals 113 into a spatial audio signal are well known in the art and they are described in further detail in the present disclosure only to an extent necessary for understanding certain aspects of the audio focus processing disclosed herein.

Hence, the plurality of audio signals 113 recorded at the audio capturing entity 111 represent and/or enable deriving a spatial audio signal that conveys a spatial audio image encompassing a range of sound directions with respect to the microphone array 121. Since the microphone array 121 and the camera entity 122 are operated in the same physical location, the plurality of audio signals 113 represents sounds in sound directions that correspond to respective positions in an image area of images obtained from the camera entity 122. With the known characteristics of the image sensor of the camera entity 122 and its position and orientation with respect to the microphone array 121, there may be at least an approximate predefined mapping between spatial positions of an image area of the images obtained from the camera entity 122 and corresponding sound directions within a spatial audio image derivable based on the plurality of audio signals 113 derived based on respective microphone signals received from the microphone array 121 and, consequently, each position in the image area may map to a corresponding sound direction in the spatial audio image derivable based on the microphone signals and vice versa. The correspondence between a sound direction and a respective position in the image area may be defined, for example, via a spatial mapping function derived based on knowledge of the spatial relationship between the camera entity 122 and the microphone array 121 together with the knowledge regarding the positions and orientations of the microphones of the microphone array 121 with respect to each other and with respect to the camera entity 122 and regarding their respective direction patterns. In other words, the spatial mapping function may define spatial relationship between sound content in the plurality of audio signals 113 and image area in images of the video stream 114.

The media processing entity 115 may be arranged to apply respective predefined preprocessing to the plurality of audio signals 113 and to the video stream 114 and provide the plurality of audio signals 113 and the captured video stream 114 to the media rendering arrangement 200. The preprocessing applied to the plurality of audio signals 113 and to the video stream 114 may comprise, for example, synchronization of the plurality of the audio signals 113 with the video stream 114 (or vice versa) to ensure temporal match between the two. In this regard, the synchronization may comprise delaying one or both of the plurality of audio signals 113 and the video stream 114 to provide the temporal alignment with the two or providing the plurality of audio signals 113 and the video stream 114 with respective timestamps that indicate the relative timing between the two and hence enable establishing synchronization between the plurality of audio signals 113 and the video stream 114 e.g. in the media processing entity 215 in the media rendering entity 210.

The plurality of audio signals 113 may be provided from the media processing entity 115 with audio metadata, which comprises information that defines a spatial relationship between the plurality of audio signals 113 and the video stream 114. In this regard, the audio metadata may specify one of more of the following: respective spatial positions of the microphones of the microphone array 121 with respect to the camera entity 122, respective orientations of the microphones of the microphone array 121 with respect to the camera entity 122, respective direction patterns or types of the microphones of the microphone array 121. The audio metadata may, alternatively or additionally, comprise the spatial mapping function described in the foregoing. The video stream 114 may be provided from the media processing entity 115 with video metadata, which comprises information concerning one or more characteristics of images of the video stream 114. In this regard, the video metadata may specify, for example, one or more of the following: an aspect ratio applied for images of the video stream 114, an image size applied for images of the video stream (e.g. as the number of pixels), a respective field of view (FOV) applied for one or more images of the video stream 114, a respective zoom factor possibly applied in capturing one or more images of the video stream 114. The audio metadata and the video metadata may be jointly referred to as audiovisual metadata.

Figure 2A:
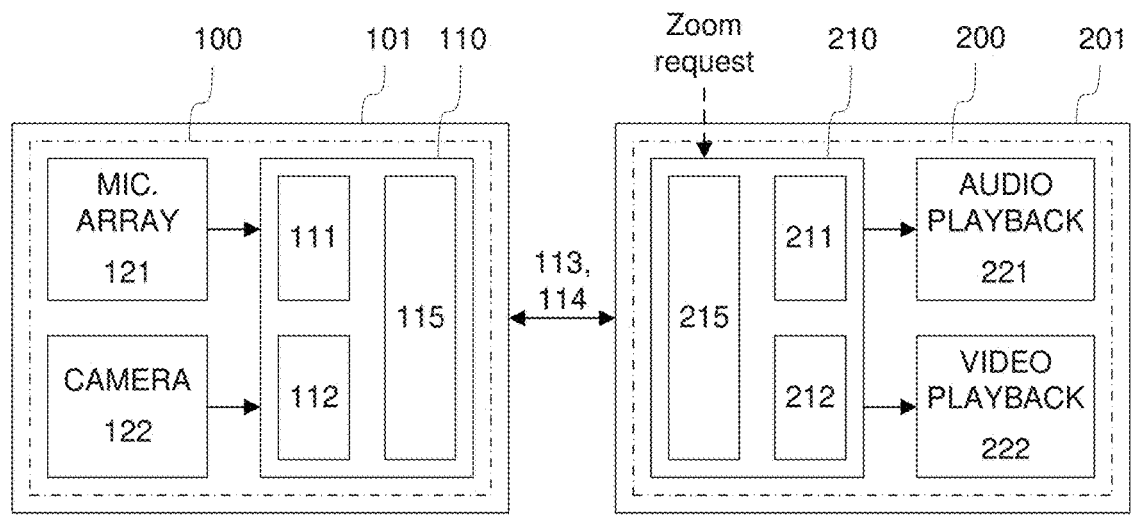
FIG. 2A illustrates an arrangement for implementing the media capturing arrangement and the media rendering arrangement according to an example.

As an example, the media capturing arrangement 100 may be implemented in a first device 101 and the media rendering arrangement 200 may be implemented in a second device 201, as illustrated by the block diagram of FIG. 2A. The provision may comprise transferring the plurality of audio signals 113 (possibly together with the audio metadata) and the video stream 114 (possibly together with the video metadata) over a communication channel or a communication network from the first device 101 to the second device 201. The transfer of the plurality of audio signals 113 and the video stream 114 may involve, for example, downloading or uploading the plurality of audio signals 113 and the video stream 114 from the first device 101 to the second device 102 or transmitting the plurality of audio signals 113 and the video stream 114 in respective audio and video packet streams from the first device 101 to the second device 102. In this example, the media processing entity 115 in the media capturing entity 110 may comprise an audio encoder for encoding the plurality of audio signals 113 and a video encoder for encoding the video stream 114 for transfer to the media processing entity 215 in the media rendering entity 210, which may comprise an audio decoder for reconstructing the plurality of audio signals 113 based on the received encoded audio signals and a video decoder for reconstructing the video stream 114 based on the received encoded video packet stream. The media processing entity 215 in the media rendering entity 210 may be further arranged to provide the reconstructed plurality of audio signals 113 for further audio processing in the audio rendering entity 211 of the media rendering entity 210 and to provide the reconstructed video stream 114 for further video processing in the video rendering entity 212 of the media rendering entity 210.

Figure 2B:
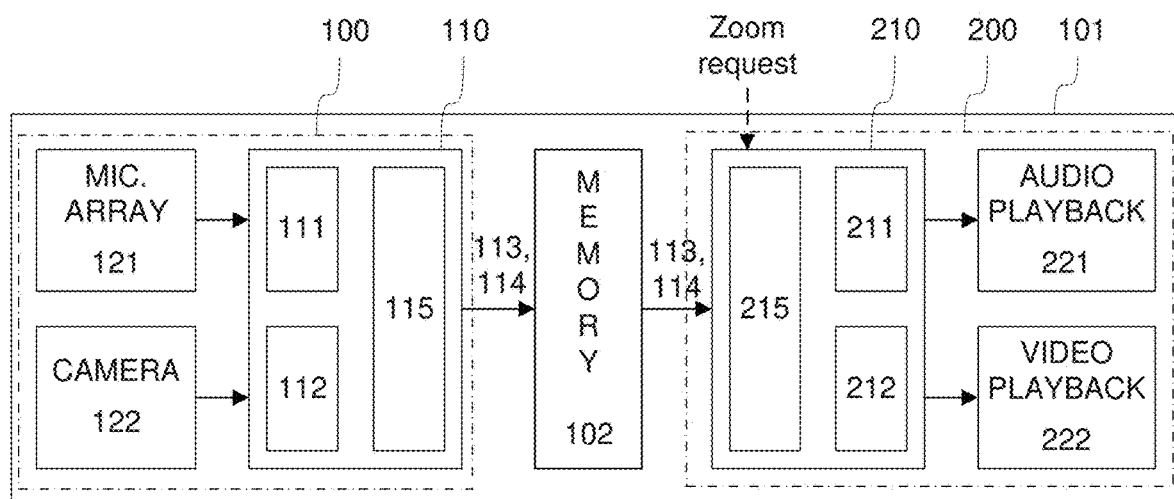
FIG. 2B illustrates an arrangement for implementing the media capturing arrangement and the media rendering arrangement according to an example.
Figure 2C:
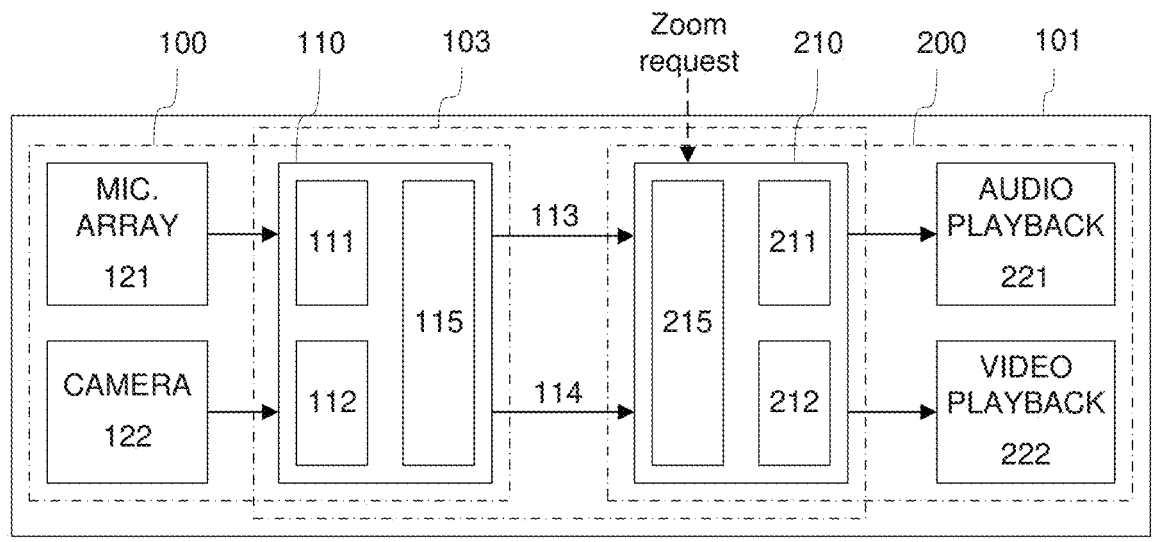
FIG. 2C illustrates an arrangement for implementing the media capturing arrangement and the media rendering arrangement according to an example.

In other examples, both the media capturing arrangement 100 and the media rendering arrangement 200 may be implemented in the first device 101, as illustrated by the respective block diagrams of FIGS. 2B and 2C. In the example of FIG. 2B, the provision of the plurality of audio signals 113 and the video stream 114 may comprise the media capturing arrangement 100 storing the plurality of audio signals 113 and the video stream 114 into a memory 102 and the media rendering arrangement 200 reading the plurality of audio signals 113 and the video stream 114 from the memory 102. In the example of FIG. 2C, the media rendering arrangement 200 receives the plurality of audio signals 113 and the video stream 114 directly from the media capturing arrangement 100. In this example, the media capturing arrangement 100 and the media rendering arrangement 200 may be implemented as a single logical entity, which may be referred to as a media processing arrangement 103. In the examples of FIGS. 2B and 2C, the respective encoding and decoding of the plurality of audio signals 113 and the video stream 114 may not be necessary and hence the media processing entity 215 may provide the plurality of audio signals 113 to the audio rendering entity 211 and provide the video stream 114 to the video rendering entity 212 either directly (FIG. 2C) or via the memory 102 (FIG. 2B).

Figure 3:
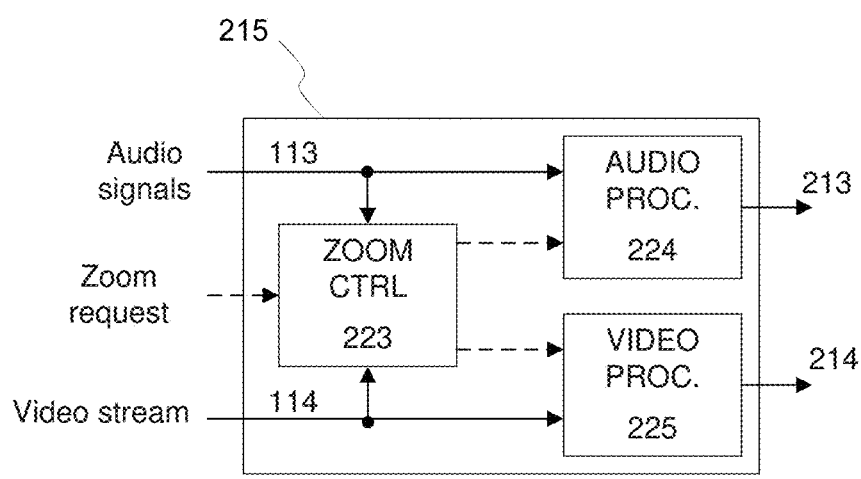
FIG. 3 illustrates a block diagram of some components and/or entities of the media processing entity according to an example.

FIG. 3 illustrates a block diagram of some components and/or entities of the media processing entity 215 according to an example. The media processing entity 215 is operable to derive a spatial audio signal 213 and a video signal 214 for provision, respectively, to the audio rendering entity 211 and to the video rending entity 212. In this regard, the spatial audio signal 213 comprises (a single-channel or a multi-channel) digital audio signal (possibly together with spatial metadata), whereas the video signal 214 comprises a sequence of digital images. The media processing entity 215 according to the example of FIG. 3 comprises a zoom controller 223 for deriving, based at least on a zoom request, one or more audio control parameters for controlling spatial characteristics of the spatial audio signal 213 and one or more video control parameters for controlling characteristics of the video signal 214, an audio processing entity 224 for deriving the spatial audio signal 213 based on the plurality of audio signals 113 in dependence of the one or more audio control parameters, and a video processing entity 225 for deriving the video signal 214 based on the video stream 114 in dependence of the one or more video control parameters. The audio processing entity 224 may comprise further components or entities in addition to those shown in the illustration of FIG. 3, for example the audio decoder and/or the video decoder described in the foregoing.

In general, the media processing entity 215 operates to derive the spatial audio signal 213 and the video signal 214 such that a spatial audio image conveyed in the spatial audio signal 213 spatially corresponds to the image area of the video signal 214. In other words, the spatial audio signal 213 spatially matches the video signal 214 such that any directional sounds included in the spatial audio image conveyed by the spatial audio signal 213 are perceived to arrive from sound directions that match spatial positions in the image area of the video signal 214 depicting respective sources of such directional sounds. Such spatial match between the spatial image of the spatial audio signal 213 rendered to a user and image content of the video signal 214 displayed to the user ensures a good user experience whereas, conversely, an apparent spatial mismatch between the spatial audio image of the spatial audio signal 213 and the image content of the video signal 214 typically results in compromised or even unacceptable user experience.

The present disclosure frequently refers to the overall image area of images of the video stream 114, which, for brevity and clarity of description, may be alternatively referred to as original image area. The zoom request applied to at least partially control derivation of the spatial audio signal 213 and the video signal 214 in the zoom controller 223 may comprise a zoom factor that defines a requested magnification factor to be applied to images of the video stream 114 in derivation of corresponding images of the video signal 214. Consequently, the zoom factor at least conceptually defines a spatial sub-portion of the original image area that has the same aspect ratio as the original image area, that is co-centered with the original image area and whose image content is magnified to fill the size of the original image area. Consequently, images of the video signal 214 provide a zoomed view to the image content in corresponding images of the video stream 114.

As examples concerning magnification of the image content from images of the video stream 114 to the corresponding images of the video signal 214, zoom factor 1× indicates that no magnification takes place and hence the image area of images of the video stream 114 in its entirety is applied as the spatial sub-portion, zoom factor 2× indicates that that the image content in the video signal 214 has twice the size in comparison to its appearance in corresponding images of the video stream 114, zoom factor 3.5× indicates that that the image content in the video signal 214 has three and half times the size in comparison to its appearance in images of the video stream 114 etc.

As described in the foregoing, the media processing entity 215 operates to derive the spatial audio signal 213 and the video signal 214 such that the spatial match between the two is provided (while preserving the temporal match between the two). In an example in this regard, the zoom controller 223 derives, based on the spatial sub-portion of the image area (in images of the video stream 114) defined via the zoom request, a sub-range of sound directions that spatially correspond to a respective range of positions of the original image area included in the spatial sub-portion and provides an indication of the derived sub-range of sound directions as part of the one or more audio control parameters to the audio processing entity 224 to enable derivation of the spatial audio signal 213 therein. The derivation of the sub-range of sound directions may be based at least in part on a predefined mapping between the sound directions and the original image area, which may be defined by the spatial mapping function described in the foregoing. The spatial mapping function may be pre-stored in the zoom controller 223 or it may be received together with the plurality of audio signals 113 and/or the video stream 114 (e.g. as part of the audio metadata). The zoom controller 223 also derives or forwards an indication of the zoom factor (or an indication of the spatial sub-portion defined via the zoom factor) to the video processing entity 225 to enable derivation of the video signal 214 therein.

Consequently, the audio processing entity 224 operates to derive, based on the plurality of audio signals 113 and in view of the sub-range of sound directions indicated by the zoom controller 223, the spatial audio signal 213 such that the indicated sub-range of sound directions is (at least conceptually) 'stretched' to cover the spatial audio image conveyed by the spatial audio signal 213 while attenuating or suppressing sounds in sound directions outside the indicated sub-range of sound directions, thereby (at least conceptually) providing audio zooming by a zoom factor corresponding to that applied for deriving the video signal 214. Along the lines described in the foregoing, audio processing techniques for processing the channels of the plurality of audio signals 113 into the spatial audio signal 213 having the above-described spatial characteristics are known in the art and suitable such techniques may be applied in the audio processing entity 224 to derive the spatial audio signal 213 accordingly. The video processing entity 225 operates to extract (e.g. crop) the indicated spatial sub-portion of the original image area and, in case the zoom factor is larger than 1×, to magnify the image content of the spatial sub-portion to fill the image area in images of the video signal 214. Also in this regard, the video processing entity 225 may apply suitable video and image processing techniques known in the art.

Preferably, the spatial audio signal 213 is provided in a spatial audio format that is directly applicable for audio playback by an audio playback entity 221 (e.g. a loudspeaker system or headphones) and, consequently, the audio rendering entity 211 may directly pass the spatial audio signal for playback by the audio playback entity 221. In case the spatial format applied for the spatial audio signal 213 is not directly compatible with the audio playback entity 221, the audio rendering entity 211 may process the spatial audio signal 213 from the spatial audio format applied by the audio processing entity 224 to a different spatial audio format that is applicable with the audio playback entity 221. Along similar lines, the video rendering entity 212 may process the video signal 214 received from the video processing entity 225 into a format suitable for video rendering by the video playback entity 222 (e.g. a display device), if any video or image format conversion in this regard is necessary.

As described in the foregoing, a zoom factor that is larger than 1× results in selecting the spatial sub-portion of the original image area in the video stream 114 and magnifying it to fill the image area of the video signal 214 and (at least conceptually) 'stretching' the spatially corresponding sub-range of sound directions to fill the spatial audio image of the spatial audio signal 213 such that the spatial match between sound sources illustrated in images of the video signal 214 and respective sound directions perceived in the spatial audio signal 213 is preserved. In this regard, due to limited spatial resolution enabled by real-life microphone arrays, relatively high zoom factors and/or sounds originating from sound sources that are relatively far from the microphone array 121 upon capturing the microphone signals that serve as basis for the plurality of audio signals 113 may pose a challenge in terms of retaining the spatial match between the spatial audio signal 213 and the video signal 214 with respect to distinct sound sources included therein.

Figure 4A:
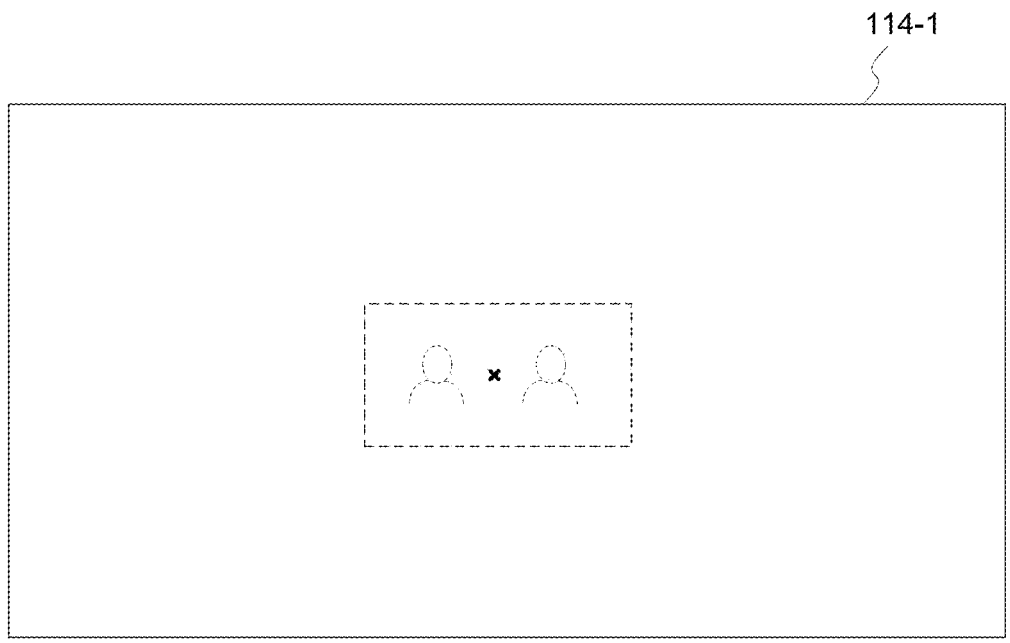
FIG. 4A schematically illustrates an image of the video stream and FIG. 4B schematically illustrates a corresponding image of the video signal 214 according to an example.
Figure 4B:
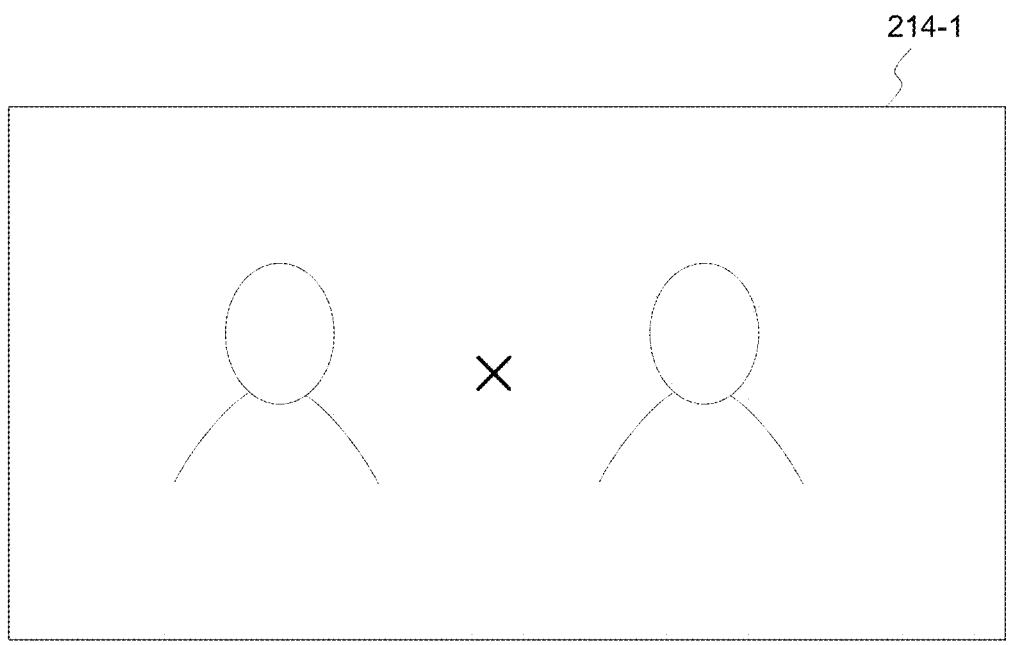

Such challenges may, in particular, concern a scenario where two sound sources in the captured audio-visual scene are relatively close to each other and respective sounds directions differ from each other only by a few degrees, which may result in capturing respective sounds originating from the two sound sources such that they are not separable from each other based on the plurality of audio signals 113. As a non-limiting example in this regard, FIG. 4A schematically illustrates an image 114-1 of the video stream 114 with two sound sources (e.g. two persons that are talking) close to the middle of the image area and FIG. 4B schematically illustrates a corresponding image 214-1 of the video signal 214 that depicts a magnified version of the spatial sub-portion of the image 114-1 indicated by the dashed rectangle, providing a zoom factor of approximately 3.5×. The respective crosses shown in the images 114-1 and 214-1 indicate the sound direction applied for sounds arriving from sound directions corresponding to the illustrations of the respective sound sources (e.g. the two person) in the respective images 114-1, 214-1. From this example it is easy to observe that in the example of FIG. 4A the spatial match between the audio and video is likely sufficient for a good user experience even if respective sounds from the two sound sources are perceived to arrive from the same sound direction, whereas in the example of FIG. 4B, assuming that the sounds from the sound directions cannot be separated from each other and repositioned accordingly, at least some user may find the sounds originating from the both sound sources arriving from the same sound direction located between the respective illustrations of the respective sound sources in the image 214-1 as inconvenient or even disturbing.

Still referring to the example of FIGS. 4A and 4B, in case the two sound sources illustrated in the images 114-1, 214-1 are readily separable based on the plurality of audio signals 113 that are derived based on the respective microphone signals, improved spatial match may be provided via the audio processing entity 224 deriving first audio signal component that represents sound from a first sound source and a second audio signal component that represents sound from a second sound source based on channels of the multi-channel audio signal 113 and deriving the spatial audio signal 213 such that the first and second audio signal components are arranged in respective sound directions of the spatial audio image that correspond the spatial positions of the image area in the image 214-1 depicting the respective sound sources. This, however, is not possible in all scenarios, as described in the following example.

Figure 5A:
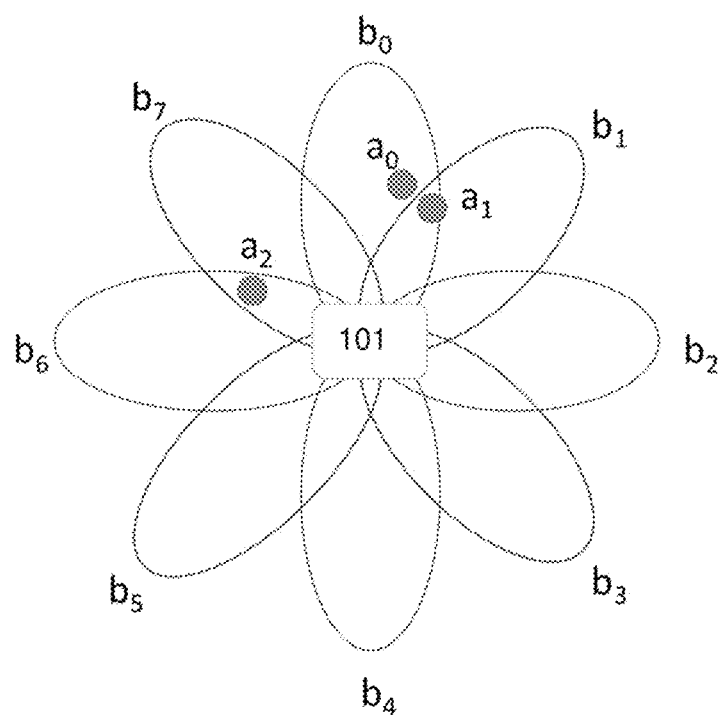
FIG. 5A schematically illustrates respective positions of sound sources with respect to microphones of a device according to an example.

An example of an arrangement of the microphone array 121 in the first device 101 and respective positions of the two sound sources with respect to the first device 101 is schematically illustrated in FIG. 5A, which depicts the first device 101 equipped with eight microphones for capturing respective eight microphone signals that may serve as basis for recording respective ones of the plurality of audio signals 113. These microphones have respective direction patterns $b_0$ to $b_7$, while FIG. 5A further schematically illustrates respective positions of first and second sound sources $a_0$ and $a_1$ that are relatively close to each other together with a third sound source $a_2$ that is further away from the first and second sources. In the example of FIG. 5A the sound from the first sound source $a_0$ is only included in the respective audio signal 113 derived based on the microphone signal captured by the microphone having the direction pattern $b_0$, whereas the sound from the second sound source $a_1$ is included in the respective audio signals 113 derived based the respective microphone signals captured by the microphones having the direction patterns $b_0$ and $b_1$. Such positions of the first and second sources $a_0$, $a_1$ with respect to the direction patterns $b_0$, $b_1$ nevertheless at least conceptually enable source separation: the first audio signal component (that represents sound from the sound source $a_0$) may be derived based on a difference between respective audio signals 113 originating from the microphones having the direction patterns $b_0$ and $b_1$, whereas the second audio signal component (that represents sound from the sound source $a_1$ may be derived based on the audio signal 113 originating from the microphone having the direction pattern $b_1$. However, information that defines correspondence between spatial positions of sound sources and respective ones of the plurality of audio signals 113 may not be available in the media processing entity 215, thereby not allowing for such source separation to be carried out therein.

Figure 5B:
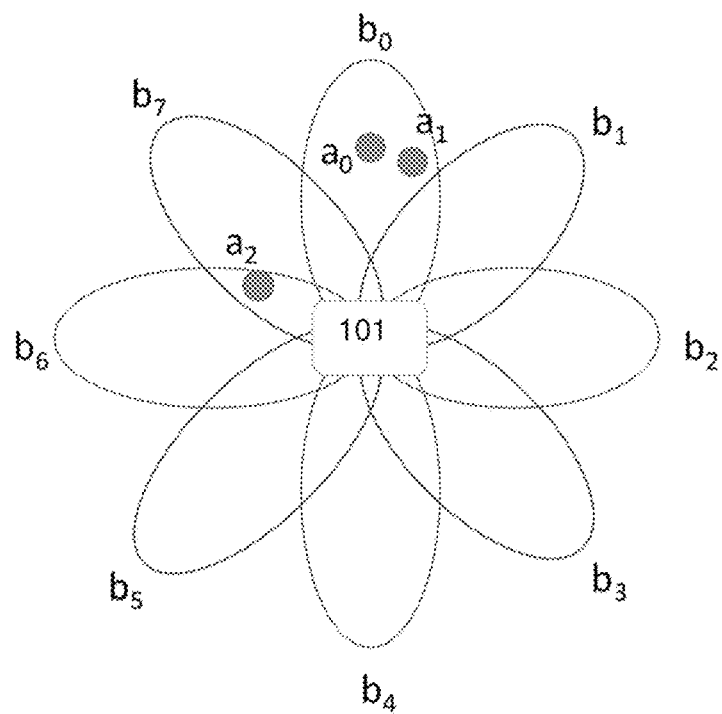
FIG. 5B schematically illustrates respective positions of sound sources with respect to microphones of a device according to an example.

Another example of an arrangement of the microphone array 121 in the first device 101 and respective positions of the first and second sound sources $a_0$, $a_1$ with respect to the first device 101 is schematically illustrated in FIG. 5B, where the first and second sound sources are both included only in the direction pattern $b_0$ and hence the respective sounds from the first and second sound sources $a_0$, $a_1$ are only included in the audio signal 113 derived based on the microphone signal captured by the microphone having the direction pattern $b_0$. Consequently, source separation for separating the respective sounds from the first and second sound sources $a_0$, $a_1$ for derivation of the first and second audio signal components is typically not possible in the media processing entity 215 based on the plurality of audio signals 113 and the associated information (e.g. the audiovisual metadata) available therein.

In order to avoid scenarios where direct implementation of the zooming request is likely to result in zooming of the media content received in the plurality of audio signals 113 and in the video stream 114 such that the spatial match between the two is compromised, the zoom controller 223 may be arranged to implement a zoom control procedure, for example, via operation according to a method 300 illustrated by a flowchart depicted in FIG. 6. The method 300 relates to zooming (image content of) one or more images of the video stream 114 into corresponding one or more images of the video signal 214, which video signal 214 is to be provided for rendering together with the spatial audio signal 213 that conveys a spatial audio image representing a range of sound directions that spatially correspond to a respective range of positions in images of the video signal 214. The operations described with references to blocks 302 to 310 of the method 300 may be varied or complemented in a number of ways without departing from the scope of the zoom control procedure according to the present disclosure, for example in accordance with the examples described in the foregoing and in the following.

The method 300 may be provided as one that is applicable for zooming one or more images of the video stream 114 into corresponding one or more images of the video steam 214 for rendering together with the spatial audio signal 213 that conveys a spatial audio image representing the range of sound directions that spatially correspond to a respective range of positions in images of the video signal 214. In contrast, the spatial audio image conveyed by the spatial audio signal 213 excludes or substantially excludes sound directions outside said range of sound directions, i.e. excludes or substantially excludes sound directions that do not spatially correspond to positions of images of the video signal (but rather spatially correspond to positions that fall outside the image area of images of the video stream 114. Herein, the range of sound directions may comprise or may be based on the sub-range of sound directions described in the foregoing.

The method 300 proceeds from reception of the video stream 114, the plurality of audio signals 113 and the audiovisual metadata comprising information that defines a spatial relationship between images of the video stream 114 and the plurality of audio signals 113 that serve as basis for deriving the spatial audio signal 213, as indicated in block 302. The method 300 further comprises determining presence of at least a first sound source and a second sound source depicted in an image of the video stream 114, wherein respective sounds originating from the first and second sound sources are to be represented in said spatial audio signal 213 by a single directional sound component, as indicted in block 304. In this regard, the single directional sound component may be one that is derivable based on the plurality of audio signals 113 in view of the audiovisual metadata but that is not separable into respective separate directional sound components that, respectively, represent the first sound source and the second sound source based on the plurality of audio signals 113. The images of the video stream 114 may or may not depict one or more further sound sources in addition to the first and second sound sources described above, whereas the plurality of audio signals 113 may convey respective sounds originating from such one or more further sound sources.

The method 300 may further comprise determining a first zoom factor threshold for zooming (image content of) said image of the video stream 114 into a corresponding image of the video signal 214 based at least in part on respective positions of the first and second sources in said image of the video stream 114 in dependence of the audiovisual metadata, as indicated in block 306. In this regard, determination of the first zoom factor threshold may comprise determining a zoom factor that results in a distance between a first position of the first sound source in said image of the video signal 214 and a second position of the second sound source in said image of the video signal 214 being smaller than or equal to a distance threshold that is dependent at least on said first and/or second positions. As an example, determination of the first zoom factor threshold may comprise determining the first zoom factor threshold as the largest zoom factor that still results in the distance between the first and second positions being smaller than or equal to the distance threshold. In another example, determination of the first zoom factor may comprise determining a (largest) zoom factor that does not result in the distance between the first position of the first sound source in said image of the video signal 214 and the second position of the second sound source in said image of the video signal 214 exceeding the distance threshold.

This determination may be carried out, for example, via sound directions of the spatial audio image conveyed by the spatial audio signal 213. As an example in this regard, determination of the first zoom factor threshold may comprise determining a zoom factor that results in a distance between a first sound direction of said spatial audio image that spatially corresponds to a position of the first sound source in the image of the video signal 214 and a second sound direction of said spatial audio image that spatially corresponds to a position of the second sound source in the image of the video signal 214 being smaller than or equal to a distance threshold that is dependent at least on said first and/or second sound directions. As an example in this regard, determination of the first zoom factor threshold may comprise determining the first zoom factor threshold as the largest zoom factor that still results in the distance between the first and second sound directions being smaller than or equal to the distance threshold. In another example, determination of the first zoom factor may comprise determining a (largest) zoom factor that does not result in the distance between the first sound direction of said spatial audio image that spatially corresponds to the position of the first sound source in the image of the video signal 214 and the second sound direction of said spatial audio image that spatially corresponds to the position of the second sound source in the image of the video signal 214 exceeding the distance threshold.

The distance between the first and second sound sources in the image of the video signal 214 and/or the distance between the first and second sound sources as well as the distance thresholds may be considered in one more spatial directions. As an example, the distance and the distance threshold may be considered in horizontal direction of the image plane and the spatial audio image (e.g. in direction of an x-axis), whereas in another example the distance and the distance threshold may be separately considered in horizontal and vertical directions of the image plane and the spatial audio image (e.g. in directions of an x-axis and a y-axis).

The first zoom factor threshold derived for this pair of images may provide an upper limit for the zoom factor that serves to ensure that the zooming applied to the image of the video stream 114 for derivation of the corresponding image of the video signal 214 together with derivation of a temporally corresponding segment of the spatial audio signal 213 having the spatial audio image that spatially matches the image of the video signal 214 results in an acceptable spatial match between the video signal 214 and the spatial audio signal 213. The first zoom factor threshold defined at least based on the respective positions of the first and/or second sound sources in the image of the video signal 214 hence serves to indicate a limit between acceptable and unacceptable spatial match between audio and video in view of the respective image-plane positions of the first and second sound sources in the image of the video signal 213 (or in the corresponding image of the video stream 113) and/or in view of respective sound directions of the first and second sound direction in the spatial audio image conveyed by the spatial audio signal 213.

The method 300 may further comprise determining a second zoom factor threshold for zooming (image content of) said image of the video stream 114 into the corresponding image of the video signal 214 as a zoom factor that results in the first and second sound sources becoming excluded from said image of the video signal 214, as indicated in block 308. In this regard, exclusion of both the first and second sound sources from the image of the video signal 214 ensures avoiding problems with the spatial match between audio and video due to excluding also the single direction sound component from the spatial audio image conveyed by the spatial audio signal 213, which, as described in the foregoing, is derived such that it represents (only) the sub-range of sound directions that spatially correspond to positions in the image of the video signal 214. The second zoom factor threshold may be, alternatively, referred to as a lower limit for the zoom factor.

Referring back to respective operations pertaining to blocks 306 and 308, the method 300 may include the determination of r the first zoom factor threshold (block 306), the determination of the second zoom factor threshold (block 308), or both the determination of the first zoom factor threshold and the determination of the second zoom factor threshold. In case the terminology referring to the first zoom factor threshold as an upper limit for the zoom factor and referring to the second zoom factor threshold as the lower limit for the zoom factor is applied, it is worth noting that despite the terms 'upper' and 'lower' the upper limit is actually smaller in value than the lower limit: in such a scenario, the allowable zoom factors are from 1× to the upper limit and from the lower limit upwards, whereas zoom factors that are higher than the upper limit but lower than the lower limit are not allowable due to risk of spatial mismatch between the audio and video.

The method 300 further comprises zooming said image of the video stream 114 into said corresponding image of the video signal 214 in accordance with the first zoom factor threshold, as indicated in block 310. Operations pertaining to block 310 may further comprise zooming said image of the video stream 114 into said corresponding image of the video signal 214 further in accordance with the second zoom factor threshold. In this regard, zooming said image of the video stream 114 into said corresponding image of the video signal 214 may comprise deriving said image of the video signal 214 based on said image of the video stream 114 in view of the first zoom factor threshold and possibly further in view of the second zoom factor threshold.

Operations pertaining to block 310 may further comprise deriving, based on the plurality of audio signals 113 and on the audiovisual metadata, a temporally corresponding segment of the spatial audio signal 213 that conveys the spatial audio image representing the range of sound directions that spatially correspond to the respective range of positions in said image of the video signal 214. As described above, the range of sound directions may comprise or may be based on the sub-range of sound directions described in the foregoing and the spatial audio signal 213 may be derived such that it conveys a spatial audio image that spatially matches the video signal 214 such that any directional sounds included in the spatial audio image conveyed by the spatial audio signal 213 are perceived to arrive from sound directions that match spatial positions in the image area of the video signal 214 depicting respective sources of such directional sounds.

As an example regarding zooming of images, zooming said image of the video stream 114 into said corresponding image of the video signal 214 in accordance with the first zoom factor threshold may comprise the zoom controller 223 receiving a zoom request indicating a requested zoom factor and zooming (the image content of) the image of the video stream 114 into the corresponding image of the video signal 214 via application of the smaller one of the requested zoom factor and the first zoom factor threshold determined for this pair of images.

In another example, zooming said image of the video stream 114 into said corresponding image of the video signal 214 in accordance with the second zoom factor threshold may comprise the zoom controller 223 receiving a zoom request indicting a requested zoom factor and zooming (the image content of) the image of the video stream 114 into the corresponding image of the video signal 214 via application of the larger one of the requested zoom factor and the second zoom factor threshold determined for this pair of images.

In further example, zooming said image of the video stream 114 into said corresponding image of the video signal 214 in dependence of the first and second zoom factor thresholds may comprise the zoom controller 223 receiving a zoom request indicting a requested zoom factor and zooming (the image content of) the image of the video stream 114 into the corresponding image of the video signal 214 via application of a zoom factor selected in the following manner:

in case the requested zoom factor is smaller than the first zoom factor threshold, the requested zoom factor is selected;

in case the requested zoom factor is larger than the second zoom factor threshold, the requested zoom factor is selected;

in case the requested zoom factor is larger than the first zoom factor threshold but smaller than the second zoom factor threshold, the one of the first and second zoom factor thresholds that is closer to the requested zoom factor is selected.

The method 300 may be applied to determine the first and/or second zoom factor thresholds in continuous manner. As an example in this regard, the continuous determination of the first and/or second zoom factor thresholds may involve deriving the first and/or second zoom factor thresholds in each image (e.g. frame) of the video stream 114 or deriving the first and/or second zoom factor thresholds according to a predefined schedule, e.g. at predefined time intervals. In another example, the first and/or second zoom factor thresholds may be determined in response to a predefined event in the video stream 114, e.g. in response to the video stream 114 including an intra frame (or another type of stand-alone frame that does not refer to other frames of the video stream 114).

Continuous determination of the first and/or second zoom factor thresholds may be advantageous even if no zoom request indicating a change in the currently applied zoom factor is received: the sound sources depicted in images of the video stream 114 may move with respect to each other e.g. due to movement of the sound sources in their physical positions, due to movement of the camera entity 122 and/or due zooming applied upon capturing the video stream 114 using the camera entity 122. Consequently, in case the currently applied zoom factor becomes non-applicable due to redetermination of the first and/or second zoom factor thresholds, the zoom controller 223 may select reselect the zoom factor in accordance with the redefined first and/or second zoom factor thresholds. The change from the currently applied zoom factor to the reselected zoom factor may take place immediately or the change from the currently applied zoom factor to the reselected zoom factor may be implemented in smaller steps e.g. over a predefined number of images (e.g. frames) of the video signal 214.

Referring back to operations pertaining to block 304, the determination of presence of first and second sound source depicted in the image of the video stream 114 that are to be represented in the spatial audio image conveyed by the spatial audio signal 213 by the single directional sound component may comprise, for example, image or video analysis carried out based on one or more images of the video stream 114 in view of the audiovisual metadata. As described in the foregoing, the audio metadata provided as part of the audiovisual metadata may provide information regarding respective positions, orientations and directional patterns of the microphones of the microphone array 121 applied for capturing the microphone signals that serve as basis for the plurality of audio signals 113, whereas the zoom controller 223 may apply this knowledge together with the image or video analysis and video metadata provided as part of the audiovisual metadata to determine presence and respective positions of the first and second sound sources depicted in the image of the video stream 114 under consideration. This determination may further involve determining that respective sounds originating from the first and second sound sources cannot be separated from each other into respective separate directional sound components and hence they need to be represented in the spatial audio image conveyed by the spatial audio signal 213 by the single directional sound component. The image analysis may comprise analysis of image content of the image of the video stream 114 under consideration, possibly together with analysis of respective image content of one or more images of the video stream 114 that precede the image under consideration and/or one or more images of the video stream 114 that follow the image under consideration.

If determining presence and respective positions of the first and second sound sources depicted in the image of the video stream 114 that are to be represented in the spatial audio image conveyed by the spatial audio signal 213 by the single directional sound component, operations pertaining to block 304 may further comprise determining a distance between the first and second sound sources in the image of the video stream 114. This distance may be referred to as a reference distance or as an original distance between the first and second sound sources. The reference distance may be derived and expressed as a reference Euclidean distance (e.g. as the Euclidean distance between the first and second sound sources depicted on the image plane of the image of the video stream 114) or as a reference angular separation between the first sound direction (that spatially corresponds to the first sound source in the image of the video stream 114) and the second sound direction (that spatially corresponds to the second sound source in the image of the video stream 114). The reference distance expressed as an Euclidean distance may be converted into corresponding reference angular separation based at least in part on the spatial relationship between the audio and video (indicated, for example, in the audio metadata) and on the FOV applied in the image of the video stream 114 (indicated, for example, in the video metadata).

Referring back to operations pertaining to block 306, the determination of the first zoom factor threshold may comprise determining the distance between the first and second sound directions in the spatial audio image conveyed by the spatial audio signal 213. In the following, this distance is predominantly referred to as a projected distance between the first and second sound directions. According to an example in this regard, the projected distance between the first and second sound directions may comprise a projected angular separation between the first and second sound directions in a spatial audio image spatially corresponding to a magnified image that may serve as an image of the video signal 214 and, consequently, also the distance threshold may be defined as an angular separation threshold. In another example, the projected distance between the first and second sound directions may comprise a projected Euclidean distance between the respective positions of the first and second sound sources on the image plane of the magnified image that may serve as an image of the video signal 214 and, consequently, also the distance threshold may be defined as an Euclidean distance threshold on the image plane of the magnified image. However, due to spatial correspondence between sound directions of the spatial audio image conveyed by the spatial audio signal 213 and positions in the image of the video signal 214 consideration of the projected distance between the first and second sound directions in view of the Euclidean distance threshold is an equivalent approach to one that considers the projected distance via the angular separation threshold. In the following, non-limiting examples of defining the distance threshold are provided with references to angular separation between the first and second sound directions that respectively spatially correspond to respective positions of the first and second sound sources in the magnified image.

Derivation of the distance between the first and second sound directions in the spatial audio image conveyed by the spatial audio signal 213 may be based on image analysis carried out for a magnified image derivable based on a corresponding image of the video stream 114. The image analysis in this regard may comprise identifying the first and second sound sources in the magnified image, determining the projected Euclidean distance between the first and second sound sources in the magnified image and determining the projected angular separation between the first sound direction (that spatially corresponds to the first sound source in the magnified image) and the second sound direction (that spatially corresponds to the second sound source in the magnified image). The angular separation may be derived based at least in part on the spatial relationship between the audio and video (indicated, for example, in the audio metadata) and on the FOV applied in the image of the video stream 114 based on which the magnified image is derived (indicated, for example, in the video metadata), further in view of a (candidate) zoom factor to be applied for deriving the magnified image.

The determination of the upper limit for the zoom factor may comprise, for example, computing the upper limit for the zoom factor as the ratio of the distance threshold and the reference distance. As an example in this regard, in case the projected distance between the first and second sound directions is considered in terms of angular separation, the upper limit for the zoom factor may be derived by dividing the angular separation threshold by the reference angular separation. In another example, in case the projected distance between the first and second sound directions is considered in terms of Euclidean distance on the image plane, the upper limit for the zoom factor may be derived by dividing the Euclidean distance threshold by the reference Euclidean distance between the first and second sound sources.

Along the lines described in the foregoing, the distance threshold depends at least on the first sound direction and/or the second sound direction with respect to the spatial audio image conveyed by the spatial audio signal 213 (or, on the position of the first object and/or the position of the second object in the magnified image). In this regard, the determination of the first zoom factor threshold may comprise deriving the distance threshold based on a representative sound direction, which may be the first sound direction, the second sound direction, or a sound direction derived based on both the first and second sound directions (e.g. an average of the two). The distance threshold may be derived as a function of a distance between the representative sound direction and the center of the spatial audio image, such that the distance threshold increases with increasing distance between the representative sound direction and the center of the spatial audio image. This reflects the fact that localization accuracy of human hearing is at its best in sound directions directly in front of the user while it gradually decreases with increasing distance from the front direction and hence an acceptable distance between the first and second sound directions in the spatial audio image also increase with increasing distance from the center of the spatial audio image. The distance threshold derived based on the representative sound direction may be referred to as a baseline distance threshold.

As a non-limiting example of determining the distance threshold based on the representative distance from the center of the spatial audio image, the distance threshold for a representative sound direction close to the center of the spatial audio image may be a few degrees, for example in a range from 2 to 5 degrees, while the distance threshold for a representative sound direction close to a side of the spatial audio image may be in the order of a few tens degrees, for example in a range from 15 to 30 degrees, e.g. 20 degrees. As an example in this regard, the distance threshold values for a plurality of distances from the center point of the spatial audio image (in one or more spatial directions) may be stored in a respective predefined mapping table and determination of the (baseline) distance threshold may comprise accessing the respective mapping table to find the distance threshold corresponding to the distance between the representative sound direction and the center point of the spatial audio image.

The distance threshold may further depend on one or more aspects that relate to the distance between the representative sound direction and the center point of the spatial audio image. Such aspects may be introduced by adding a respective distance threshold component to the baseline distance threshold described in the foregoing. As an example in this regard, the baseline distance threshold may be complemented by a distance threshold component that reflects an allowable positional mismatch between a position of a certain sound source in the image of the video signal 214 (or in the image of the video stream 114) and the sound direction of a directional sound component that represents the certain sound source in the spatial audio image of the spatial audio signal 213. In an example, such a distance threshold component may be provided as a fixed predetermined value that is independent of the representative sound direction and may have a value, for example, in a range from +/−5 to +/−15 degrees, e.g. +/−10 degrees. In another example, such a distance threshold component may be derived as a function of the distance between the representative sound direction and the center of the spatial audio image such that its value increases with increasing distance between the representative sound direction and the center of the spatial audio image, for example such that the value gradually increases from a few degrees up to 15 degrees. As an example for the latter approach, the distance threshold component values for a plurality of distances from the center point of the spatial audio image (in one or more spatial directions) may be stored in a respective predefined mapping table and determination of the distance threshold component may comprise accessing the respective mapping table to find the distance threshold component corresponding to the distance between the representative sound direction and the center point of the spatial audio image.

The distance threshold may further depend on one or more aspects that relate to the spectral characteristics of the single directional sound component that represents the first and second sound sources in the spatial audio image conveyed by the spatial audio signal 213. Such aspects may be introduced by adding a respective distance threshold component to the baseline distance threshold described in the foregoing. In this regard, a respective distance threshold component reflecting a spectral characteristic of the single directional sound component may be determined based an extent of low-frequency emphasis in the single directional sound component. As an example in this regard, the extent of low-frequency emphasis may be indicated via a representative frequency derived based on sound content in the single directional sound component. In this regard, the representative frequency may reflect e.g. the highest frequency component identified in the single directional sound component or a threshold frequency below which a predefined percentage (for example in a range from 50% to 95%, e.g. 80% or 95%) of the energy of the sound content of the single directional sound component lies. Since the localization accuracy of the human hearing increases with increasing frequency of the sound, the respective distance threshold component may be set to value that decreases with increasing representative frequency. As an example in this regard, the distance threshold component values for a plurality of frequencies may be stored in a respective predefined mapping table and determination of the distance threshold component may comprise accessing the respective mapping table to find the distance threshold component corresponding to the representative frequency.

The distance threshold may further depend on one or more aspects that reflect user specific requirements for the spatial match between the audio and video, e.g. user preferences concerning the spatial resolution or spatial accuracy of the sound direction of the spatial audio image applied for the single directional sound component that represents both the first and second sound sources in the spatial audio signal 213. Such aspects may be introduced by adding a respective distance threshold component to the baseline distance threshold described in the foregoing. Such user specific requirements may be obtained, for example, as user input received via a user interface of the device implementing the zoom controller 223. Depending on the case, the user specific requirements may, for example, impose more relaxed requirements for localization accuracy of directional sound in predefined sound directions.

In another example, the user specific requirements for the spatial match between the audio and video may comprise an indication of a preferred viewing distance with respect to a display device (e.g. in the video playback entity 222), wherein the preferred viewing distance may be applied to adjust determination of the spatial correspondence between audio and video, in determination of one or both of the upper and lower limits for the zoom factor (cf. blocks 306 and 308 of the method 300), and/or in derivation of the spatial audio signal 213 based on the plurality of audio signals 113 (cf. block 310 of the method 300).

In the examples described in the foregoing, the determination of the first zoom factor threshold implicitly assumes inclusion of both the first sound source and the second sound source in the magnified image. In other examples, one of the following approaches may be applied instead:

The determination of the first zoom factor threshold may require that at least one of the first and second sound sources remains included in the magnified image, while other aspects pertaining to determination of the first zoom factor threshold may follow the examples described in the foregoing.

The determination of the first zoom factor threshold may require that at least one of the first and second sound sources remains included in the magnified image but the determination of the first zoom factor threshold considers the distance between the one of the first and second sound sources included in the magnified image and a closest edge of the magnified image instead of the distance between the first and second sound sources. In an example, the closest edge comprises the closest edge of the magnified image in horizontal direction of the image plane (e.g. in direction of an x-axis of the image plane), whereas in another example the closest edge comprises the closest edge of the magnified image in vertical direction of the image plane (e.g. in direction of a y-axis of the image plane).

The determination of the first zoom factor threshold may strictly require that both the first sound source and the second sound source remain included in the magnified image. Consequently, the first zoom factor threshold may be defined as the smaller of a first zoom factor that results in one of the first and second sound sources being excluded from the magnified image and a second zoom factor that results in the distance-threshold-exceeding distance between the first and second sound sources.

Referring back to operations pertaining to block 308, the determination of the second zoom factor threshold may comprise finding a zoom factor that results in both the first and second sound sources becoming excluded from the magnified image to be applied for the video signal 214. As an example in this regard, such determination may comprise finding the smallest zoom factor that results in the first and second sound becoming excluded from the magnified image.

Referring back to respective operations pertaining to blocks 306 and 308, the method 300 may include providing deriving a zoom factor indicator that provides information regarding allowable zoom factors in view of the upper limit for the zoom factor and/or the lower limit for the zoom factor. The zoom factor indicator hence serves to provide the user with information regarding allowable zoom factors, comprising respective indications of one or both of the first and second zoom factor thresholds, possibly in view of the zoom factors (otherwise) available for use. The zoom controller 223 provides the zoom factor indicator to the video rendering entity 212, where the zoom factor indicator may be superimposed on images of the video signal 214 or otherwise provided for display to the user together with the video signal 214.

Figure 7A:
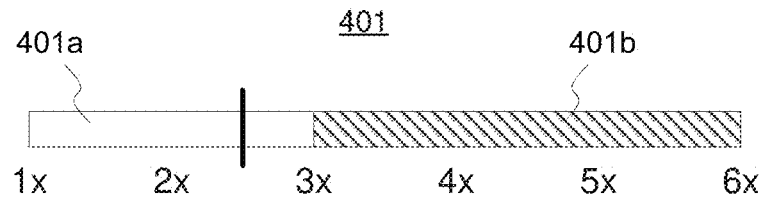
FIGS. 7A and 7B schematically illustrate zoom indicators according to respective examples.
Figure 7B:
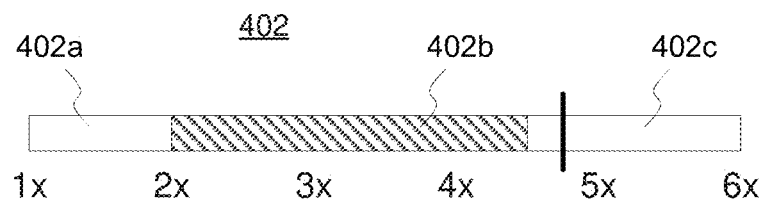
Figure 7C:
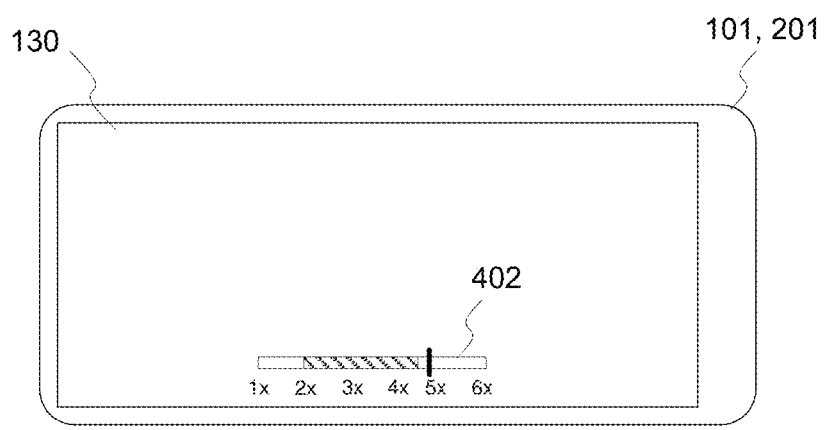
FIG. 7C schematically illustrates a zoom indicator shown on a display of a device according to an example.

FIGS. 7A, 7B and 7C schematically illustrate non-limiting examples of the zoom factor indicator provided as a bar presentation that serves to indicate allowable and non-allowable zoom factors for a user. FIG. 7A illustrates a zoom indicator 401 where only the first zoom factor threshold has been determined. In this example, the zoom indicator comprises a first portion 401a that indicates a range of allowable zoom factors from 1× to approx. 3× and a second portion 401b that indicates a range of unallowable zoom factors from approx. 3× upwards with the vertical line indicating the currently applied zoom factor approx. at 2×. FIG. 7B illustrates a zoom indicator 402 where both the first and second zoom factor thresholds have been determined. In this example, the zoom indicator comprises a first portion 402a that indicates a first range of allowable zoom factors from 1× to approx. 2.5×, a second portion 402b that indicates a range of unallowable zoom factors from approx. 2× to approx. 4.5×, and a third portion 402c that indicates a second range of allowable zoom factors from approx. 4.5× upwards with the vertical line indicating the currently applied zoom factor approx. at 4.75×. FIG. 7C illustrates the device 101, 201 provided with a display 130 that may serve as the video playback entity 222, where the display 130 is arranged to display the video signal 214 to a user of the device 101, 102 with the zoom factor indicator 402 superimposed on images of the video stream 214.

In the examples described in the foregoing, the first and/or second zoom factor thresholds are, at least implicitly, applied to disable certain zoom factors such that they are not available for the user. In other examples, the first and/or second zoom factor thresholds may be provided as recommendations to the user, e.g. via providing a zoom factor indicator (e.g. the zoom factor indicator 401, 402) derived accordingly to be displayed to the user together with the video signal 214 (e.g. by superimposing the zoom factor indicator on images of the video signal 214).

The examples described in the foregoing with references to the media processing arrangement illustrated by respective block diagrams of FIGS. 1A, 1B, 2A, 2B and 2C and to the zoom controller 223 described with references to FIG. 3 at least implicitly pertain to offline processing of pre-captured plurality of audio signals 113 and pre-captured video stream 114, respectively, into the spatial audio signal 213 and the video signal 214 for rendering to a user. In particular, the zoom control procedure according to the method 300 is described with references to the zoom controller provided in the media processing entity 215.

In such a rendering scenario where a user is consuming or playing back the audio-visual scene captured in the plurality of audio signals 113 and in the video stream 114 he or she may apply zooming (e.g. cause issuing the zoom request to the zoom controller 223) using the device controls provided in a user interface of the device implementing the zoom controller 223. In a non-limiting example, the user may be watching the video signal 224 and listening to the spatial audio signal 213 using a mobile device comprising a touchscreen display. The playback controls and/or the first and/or second zoom factor thresholds derived via operation of the zoom controller 223 may be displayed on the display together with the video signal 214, for example via the zoom factor indicator 401, 402 described in the foregoing. The user may use touch or hovering inputs to zoom on the video played on the display of the mobile device. In case the user input results in requesting an unallowable zoom factor in view of the first and/or the second zoom factor thresholds, the requested zoom factor may be forced to an allowable zoom factor in accordance with the first and/or second zoom factor thresholds, as described in the foregoing. Alternatively, instead of directly converting the user-requested zoom factor into one that is compliance with the first and/or second zoom factor thresholds, a zoom request that would lead to an situation where the user may hear audio which may not correspond with the objects shown on the display, an indication in this regard may be displayed on the display or provided via another element of the user interface.

Figure 8A:
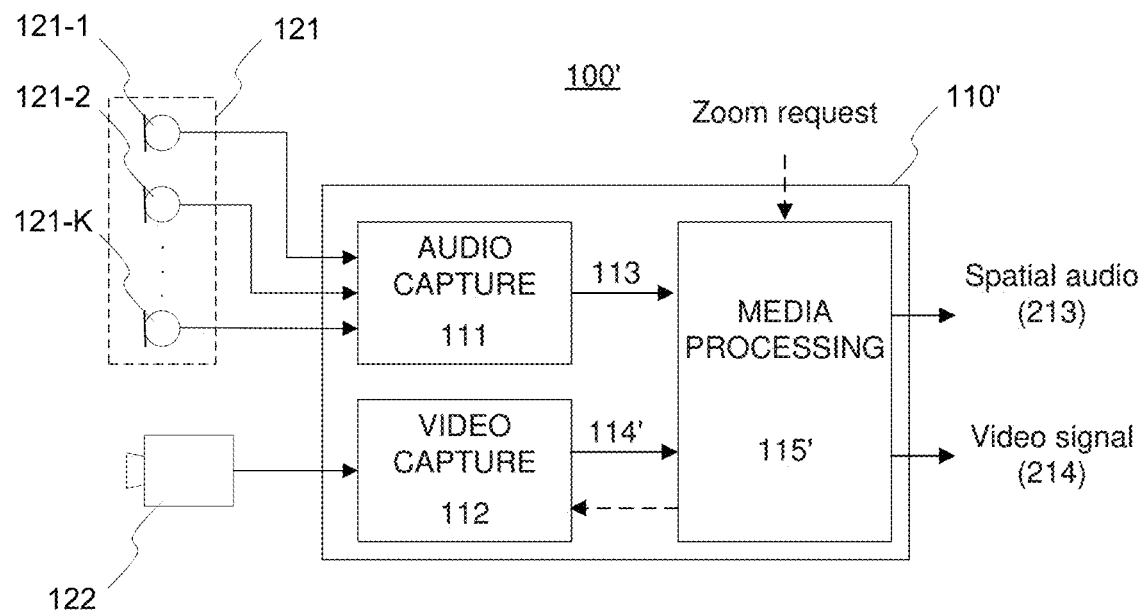
FIG. 8A illustrates a block diagram of some components and/or entities of a media capturing arrangement according to an example.
Figure 8B:
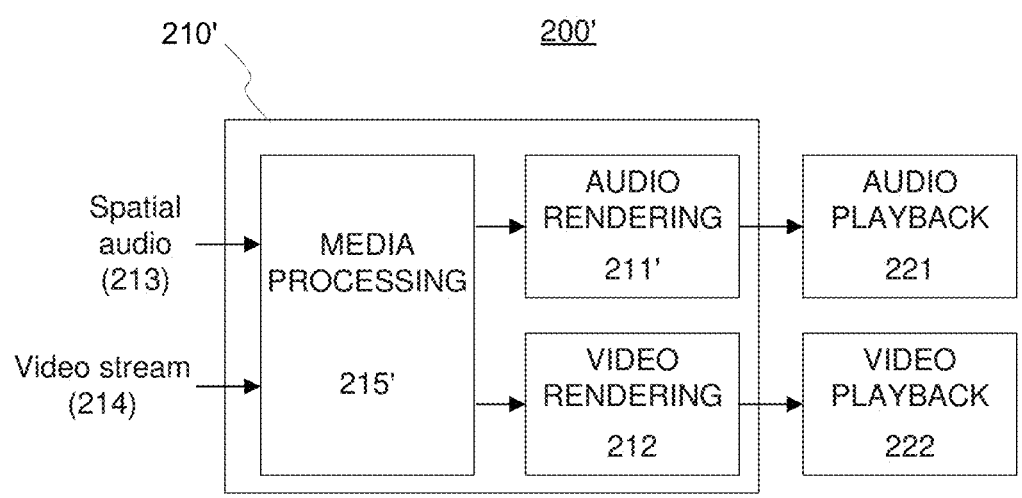
FIG. 8B illustrates a block diagram of some components and/or entities of a media rendering arrangement according to an example.
Figure 9:
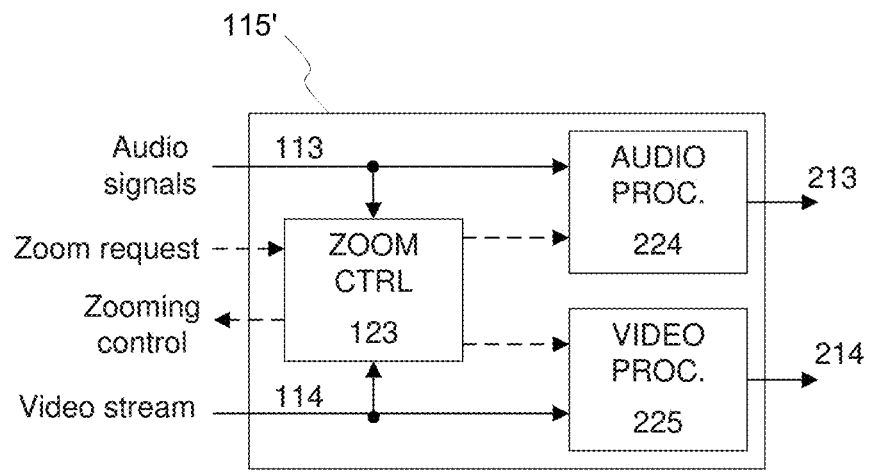
FIG. 9 illustrates a block diagram of some components and/or entities of the media processing entity according to an example.

FIG. 8A illustrates a block diagram of some components and/or entities of a media capturing arrangement 100' according to an example and FIG. 8B illustrates a block diagram of some components and/or entities of a media rendering arrangement 200' according to an example. The media capturing arrangement 100' comprises a media capturing entity 110' that includes the audio capturing entity 111, the video capturing entity 112 and a media processing entity 115'. The media rendering arrangement 200' comprises a media rendering entity 210' that includes an audio rendering entity 211', the video rendering entity 212' and a media processing entity 215'. The system including the media capturing arrangement 100' and the media rendering arrangement 200' differs from the one including the media capturing arrangement 100 and the media rendering arrangement 200 in that the audio zoom control procedure according to the method 300 may be provided in a zoom controller 123 illustrated in FIG. 9 via an exemplifying block diagram of some components of the media processing entity 115', thereby enabling application of the first and/or second zoom factor thresholds upon capturing audio and video using the media capturing arrangement 100'. In an arrangement involving the media processing entity 115', the media processing entity 215' does not include the zoom controller 223 described in the foregoing with references to the media processing entity 215 but the (video and audio) zooming and associated zoom control according to the method 300 takes place in the media processing entity 115'.

The operation of the zoom controller 123 is similar to that described in the foregoing for the zoom controller 223, mutatis mutandis. A difference to operation of the media processing entity 115 is that due to operation of the zoom controller 123 the operation of the media processing entity 115' results in provision of the spatial audio signal 213 (instead of the plurality of audio signals 113) and the possibly zoomed video signal 214 (instead of the video stream 113), and the spatial audio signal 213 and the video signal 214 derived therein may be provided for local rendering, respectively, by the audio playback entity 221 and the video playback entity 222 provided (not shown in respective illustrations of FIGS. 8A and 8B) in the device that serves to provide the media processing entity 115', e.g. the device 101. Instead of or in addition to providing the spatial audio signal 213 and the video signal 214 to the media rendering arrangement 200', the media processing entity 115' of the media capturing arrangement 100' may store the spatial audio signal 213 and the video signal 214 to a memory provided in the device that serves to provide the media processing entity 115'. Another difference to operation of the media processing entity 115 is that operation of the zoom controller 123 may directly affect, via a zooming control signal provided to the video capturing entity 112, the zooming applied upon capturing a video stream 114' using the camera entity 122. In other words, the first and/or second zoom factor thresholds may be directly applied upon capturing the video stream 114'. Depending on the implementation of the camera entity 122 and/or the video capturing entity 112, in some examples zooming in accordance with the first and/or second zoom factor threshold may be at least in part carried out by the camera entity 122 and/or the video capturing entity 112 and, consequently, the processing in the video processing entity 225 of the zoom controller 123 may comprise passing the (already-zoomed) video stream 114 obtained from the video capturing entity 112 as the video signal 214.

At least some of the operations, procedures and/or functions described in the foregoing with references to the zoom controller 123, 223 and/or to the method 300 may be implemented by respective hardware means, by respective software means, or by a respective combination of the hardware means and software means. As an example in this regard, the respective operations pertaining to blocks 302 to 310 of the method 300 may be implemented, respectively, as means for receiving the video stream 114 and the audiovisual metadata, means for determining presence of the at least first and second sound sources in the image of the video stream 114 respective sounds of which are to be represented in the spatial audio signal 214 as the single directional sound component, means for determining the first zoom factor threshold, means for determining the second zoom factor threshold and means for zooming images.

Figure 10:
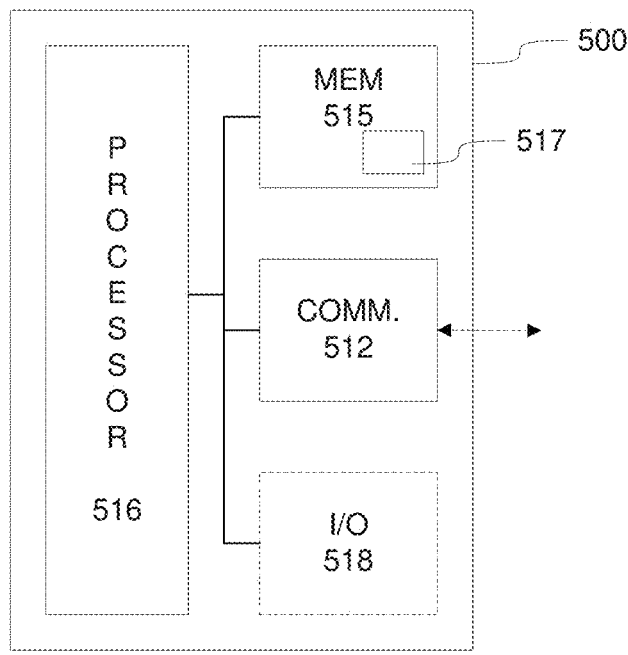
FIG. 10 illustrates a block diagram of some elements of an apparatus according to an example.

As another example for implementing at least some of the operations, procedures and/or functions described in the foregoing, FIG. 10 illustrates a block diagram of some components of an exemplifying apparatus 500 that may be employed e.g. in implementing the zoom controller 123, 223 or another device applied for implementing the method 300. The apparatus 500 may comprise further components, elements or portions that are not depicted in FIG. 10.

The apparatus 500 comprises a processor 516 and a memory 515 for storing data and computer program code 517. The memory 515 and a portion of the computer program code 517 stored therein may be further arranged to, with the processor 516, to implement at least some of the operations, procedures and/or functions described in the foregoing in context of the zoom controller 123, 223 and/or the method 300 described in the foregoing.

The apparatus 500 comprises a communication portion 512 for communication with other devices. The communication portion 512 comprises at least one communication apparatus that enables wired or wireless communication with other apparatuses. A communication apparatus of the communication portion 912 may also be referred to as a respective communication means.

The apparatus 500 may further comprise user I/O (input/output) components 518 that may be arranged, possibly together with the processor 516 and a portion of the computer program code 517, to provide a user interface for receiving input from a user of the apparatus 500 and/or providing output to the user of the apparatus 500 to control at least some aspects of operation of the zoom controller 123, 223 in implementing the method 300 (or otherwise). The user I/O components 518 may comprise hardware components such as a display, a touchscreen, a touchpad, a mouse, a keyboard, and/or an arrangement of one or more keys or buttons, etc. The user I/O components 518 may be also referred to as peripherals. The processor 516 may be arranged to control operation of the apparatus 500 e.g. in accordance with a portion of the computer program code 517 and possibly further in accordance with the user input received via the user I/O components 518 and/or in accordance with information received via the communication portion 512.

Although the processor 516 is depicted as a single component, it may be implemented as one or more separate processing components. Similarly, although the memory 515 is depicted as a single component, it may be implemented as one or more separate components, some or all of which may be integrated/removable and/or may provide permanent/semi-permanent/dynamic/cached storage.

The computer program code 517 stored in the memory 515, may comprise computer-executable instructions that control one or more aspects of operation of the apparatus 500 when loaded into the processor 516. As an example, the computer-executable instructions may be provided as one or more sequences of one or more instructions. The processor 516 is able to load and execute the computer program code 517 by reading the one or more sequences of one or more instructions included therein from the memory 515. The one or more sequences of one or more instructions may be configured to, when executed by the processor 516, cause the apparatus 500 to carry out at least some of the operations, procedures and/or functions described in the foregoing in context of the zoom controller 123, 223 and/or the method 300.

Hence, the apparatus 500 may comprise at least one processor 516 and at least one memory 515 including the computer program code 517 for one or more programs, the at least one memory 515 and the computer program code 517 configured to, with the at least one processor 516, cause the apparatus 500 to perform at least some of the operations, procedures and/or functions described in the foregoing in context of the zoom controller 123, 223 and/or the method 300 described in the foregoing.

The computer programs stored in the memory 515 may be provided e.g. as a respective computer program product comprising at least one computer-readable non-transitory medium having the computer program code 517 stored thereon, the computer program code, when executed by the apparatus 500, causes the apparatus 500 at least to perform at least some of the operations, procedures and/or functions described in the foregoing in context of the zoom controller 123, 223 and/or the method 300 described in the foregoing. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

Although functions have been described with reference to certain features, those functions may be performable by other features whether described or not. Although features have been described with reference to certain embodiments, those features may also be present in other embodiments whether described or not.

The invention claimed is:

1. An apparatus comprising:
   at least one processor; and at least one memory including computer program code; the at least one memory and the computer program code configured to, with the at least one processor, cause the apparatus at least to:
   receive a video stream, a plurality of audio signals and audiovisual metadata that defines a spatial relationship between images of said video stream and said plurality of audio signals that serve as basis for a spatial audio signal;
   determine presence of at least a first sound source and a second sound source depicted in an image of the video stream, wherein respective sounds originating from the first and second sound sources are to be represented in said spatial audio signal by a single directional sound component;
   determine a first zoom factor threshold for zooming said image of the video stream into a corresponding image of a video signal based at least in part on respective positions of said first and second sound sources in said image of the video stream in dependence of said audiovisual metadata; and
   zoom said image of the video stream into said corresponding image of the video signal in accordance with the first zoom factor threshold.

2. An apparatus according to claim 1, wherein the at least one memory and the computer program code are further configured to, with the at least one processor, cause the apparatus to:
   derive, based on the plurality of audio signals and said audiovisual metadata, a temporally corresponding segment of the spatial audio signal that conveys said spatial audio image representing said range of sound directions that spatially correspond to said respective range of positions in said image of the video signal.

3. An apparatus according to claim 1, wherein determining the first zoom factor threshold is arranged to determine a zoom factor that results in a distance between a first position of the first sound source in said image of the video signal and a second position of the second sound source in said image of the video signal being smaller than or equal to a distance threshold that is dependent at least on said first or second positions.

4. An apparatus according to claim 1, wherein determining the first zoom factor threshold is arranged to determine a zoom factor that results in a distance between a first sound direction of said spatial audio image that spatially corresponds to a first position of the first sound source in said image of the video signal and a second sound direction of said spatial audio image that spatially corresponds to a second position of the second sound source in said image of the video signal being smaller than or equal to a distance threshold that is dependent at least on said first or second sound directions.

5. An apparatus according to claim 3, wherein determining the first zoom factor threshold is arranged to derive the distance threshold based at least on distance between a representative sound direction and a center point of said spatial audio image such that the distance threshold increases with increasing distance of the representative sound direction from said center point, where the representative sound direction comprises one of the following: the first sound direction, the second sound direction, or a sound direction derived based on the first and second sound directions.

6. An apparatus according to claim 3, wherein the distance threshold is further dependent on spectral characteristics of said single directional sound component and wherein determining the first zoom factor threshold is arranged to derive the distance threshold based at least on a representative frequency derived based on the single directional sound component such that the distance threshold decreases with increasing low-frequency emphasis in the single directional sound component.

7. An apparatus according to claim 1, wherein the at least one memory and the computer program code are further configured to, with the at least one processor, cause the apparatus to:
receive a requested zoom factor; and
zoom said image of the video stream into said corresponding image of the video signal using the smaller of the requested zoom factor and the first zoom factor threshold.

8. An apparatus according to claim 1, wherein the at least one memory and the computer program code are further configured to, with the at least one processor, cause the apparatus to:
determine a second zoom factor threshold for zooming said image of the video stream into the corresponding image of the video signal as a zoom factor that results in the first and second sound sources becoming excluded from the image of the video signal; and
zoom said image of the video stream into said corresponding image of the video signal further in accordance with the second zoom factor threshold.

9. An apparatus according to claim 8, wherein the at least one memory and the computer program code are further configured to, with the at least one processor, cause the apparatus to:
receive a requested zoom factor; and
zoom said image of the video stream into said corresponding image of the video signal using a zoom factor selected in a manner, comprising:
in case the requested zoom factor is smaller than the first zoom factor threshold, the requested zoom factor is selected,
in case the requested zoom factor is larger than the second zoom factor threshold, the requested zoom factor is selected,
in case the requested zoom factor is larger than the first zoom factor threshold but smaller than the second zoom factor threshold, the one of the first and second zoom factor thresholds that is closer to the requested zoom factor is selected.

10. An apparatus according to claim 1, wherein the audiovisual metadata comprises audio metadata that comprises one or more of the following:
information defining respective spatial positions of a plurality of microphones serving basis for capturing respective ones of the plurality of audio signals with respect to a camera applied for capturing the video stream;
information defining respective orientations of the plurality of microphones serving basis for capturing the respective ones of the plurality of audio signals with respect to the camera applied for capturing the video stream;
information defining respective direction patterns of the plurality of microphones serving basis for capturing the respective ones of the plurality of audio signals with respect to the camera applied for capturing the video stream; or
a spatial mapping function that defines spatial relationship between sound content in the plurality of audio signals and image area in images of the video stream.

11. An apparatus according to claim 1, wherein the audiovisual metadata comprises video metadata that comprises information defining a view of field applied for said one or more images of the video stream.

12. An apparatus according to claim 1, wherein determining presence of the first and second sound sources is arranged to:
apply image analysis at least to said image of the video stream to identify presence of the first and second sound sources therein; and
determine, based on the audiovisual metadata and respective positions of the first and second sound sources in said image of the video stream, that the first and second sound sources identified in said image of the video stream cannot be separated into respective separate directional sound components.

13. An apparatus according to claim 1, wherein the at least one memory and the computer program code are further configured to, with the at least one processor, cause the apparatus to:
derive a zoom factor indicator that provides information regarding allowable zoom factors at least in view of the first zoom factor threshold; and
provide the zoom factor indicator for rendering together with said image of the video signal.

14. A method comprising:
receiving a video stream, a plurality of audio signals and audiovisual metadata that defines a spatial relationship between images of the video stream and said plurality of audio signals that serve as basis for a spatial audio signal;
determining presence of at least a first sound source and a second sound source depicted in an image of the video stream, wherein respective sounds originating from the first and second sound sources are to be represented in said spatial audio signal by a single directional sound component;
determining a first zoom factor threshold for zooming said image of the video stream into a corresponding image of a video signal based at least in part on respective positions of said first and second sound sources in said image of the video stream in dependence of said audiovisual metadata; and zooming said image of the video stream into said corresponding image of the video signal in accordance with the first zoom factor threshold.

15. A method according to claim 14, further comprising:
deriving, based on the plurality of audio signals and said audiovisual metadata, a temporally corresponding segment of the spatial audio signal that conveys said spatial audio image representing said range of sound directions that spatially correspond to said respective range of positions in said image of the video signal.

16. A method according to claim 14, wherein determining the first zoom factor threshold is arranged to determine a zoom factor that results in a distance between a first position of the first sound source in said image of the video signal and a second position of the second sound source in said image of the video signal being smaller than or equal to a distance threshold that is dependent at least on said first or second positions.

17. A method according to claim 14, wherein determining the first zoom factor threshold is arranged to determine a zoom factor that results in a distance between a first sound direction of said spatial audio image that spatially corresponds to a first position of the first sound source in said image of the video signal and a second sound direction of said spatial audio image that spatially corresponds to a second position of the second sound source in said image of the video signal being smaller than or equal to a distance threshold that is dependent at least on said first or second sound directions.

18. A method according to claim 16, wherein determining the first zoom factor threshold is arranged to derive the distance threshold based at least on distance between a representative sound direction and a center point of said spatial audio image such that the distance threshold increases with increasing distance of the representative sound direction from said center point, where the representative sound direction comprises one of the following: the first sound direction, the second sound direction, or a sound direction derived based on the first and second sound directions.

19. A method according to claim 14, further comprising:
deriving a zoom factor indicator that provides information regarding allowable zoom factors at least in view of the first zoom factor threshold; and
providing the zoom factor indicator for rendering together with said image of the video signal.

20. A non-transitory computer readable medium comprising program instructions stored thereon for performing at least the following:
receiving a video stream, a plurality of audio signals and audiovisual metadata that defines a spatial relationship between images of the video stream and said plurality of audio signals that serve as basis for a spatial audio signal;
determining presence of at least a first sound source and a second sound source depicted in an image of the video stream, wherein respective sounds originating from the first and second sound sources are to be represented in said spatial audio signal by a single directional sound component;
determining a first zoom factor threshold for zooming said image of the video stream into a corresponding image of a video signal based at least in part on respective positions of said first and second sound sources in said image of the video stream in dependence of said audiovisual metadata; and
zooming said image of the video stream into said corresponding image of the video signal in accordance with the first zoom factor threshold.

* * * * *